United States Patent [19]
Cassar

[11] 3,758,637
[45] Sept. 11, 1973

[54] CROSSLINKED POLYUREA FROM DIHYDRAZIDES OF METHYLATED MUCONIC ACIDS

[75] Inventor: Richard D. Cassar, West Chester, Pa.

[73] Assignee: Sun Research and Development Co., Philadelphia, Pa.

[22] Filed: Dec. 30, 1971

[21] Appl. No.: 214,402

[52] U.S. Cl........................ 260/859 R, 260/77.5 CH
[51] Int. Cl............................................. C08g 41/04
[58] Field of Search ..................... 260/859, 77.5 CH

[56] References Cited
UNITED STATES PATENTS
3,004,945   10/1961   Farago ........................ 260/77.5 CH
FOREIGN PATENTS OR APPLICATIONS
1,044,267   9/1966   Great Britain .............. 260/77.5 CH OTHER PUBLICATIONS
Milas, Nicholas A. et al., Chemical Abstracts, volume 51, 2596h 1957.

Primary Examiner—Paul Lieberman
Attorney—George L. Church, Donald R. Johnson et al.

[57] ABSTRACT

Novel linear polymers having high melting points and suitable for use as adhesives, sealants, films, surface coatings and as chromotographic agents can be prepared from dihydrazides of methylated muconic acids either singularly or in mixtures with each other and an organic diisocyanate. The linear polymer may also be crosslinked by heat or free radicals or with ethylenically unsaturated monomers to produce useful films and coatings.

4 Claims, No Drawings

CROSSLINKED POLYUREA FROM DIHYDRAZIDES OF METHYLATED MUCONIC ACIDS

BACKGROUND OF THE INVENTION

1. Field of the Invention

The invention relates to new and useful synthetic polymers.

2. Description of the Prior Art

Recent advances in microbiological syntheses of organic acids from petroleum substrates have provided commercially feasible methods for high volume economical production of methylated muconic acids. Particularly, U.S. Pat. No. 3,383,289, issued May 14, 1968, to Raymond et al. and U.S. Pat. No. 3,440,158, issued Apr. 28, 1969, to George Suld disclose methods for preparing methylated muconic acids. Meanwhile there is a constant endeavor in the field of polymer chemistry to obtain synthetic polymeric material having outstanding chemical and physical properties. It has been found that recently discovered derivatives of methylated muconic acid specifically disclosed in commonly assigned application Ser. No. 49,176, of Anne R. Donnell when polymerized with organic diisocyanates produce a polymer having superior qualities.

SUMMARY OF THE INVENTION

A new group of synthetic polymer compositions having outstanding chemical and mechanical properties which can retain these properties by withstanding the degradative effects of heat, oxidation and ultraviolet light has now been discovered. These polymers have utility as adhesives, sealants, films, surface coatings and as chromatographic agents.

Briefly stated the instant invention comprises polymers having the general formula:

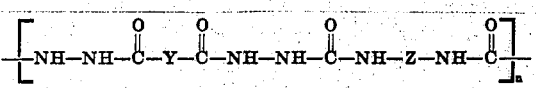

wherein Y is a divalent radical selected from the group consisting of:

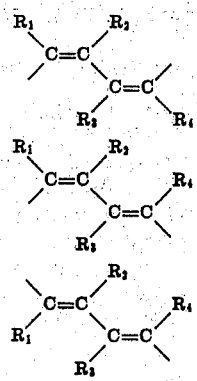

wherein $R_1$, $R_2$, $R_3$ and $R_4$ are selected from hydrogen and $-CH_3$ with at least one R being $-CH_3$.

Z is an organic divalent radical selected from the group consisting of alkylene, arylene, cycloalkylene, alkarylene and aralkylene and $n$ is the number of repeating units.

DESCRIPTION OF THE PREFERRED EMBODIMENTS

The novel polymers of this invention are prepared by polymerizing the dihydrazides of methylated muconic acids (and mixtures thereof with each other) with an organic diisocyanate. The present polymers are particularly interesting since they provide an abundance of functional groups e.g., amide and carboxy which may serve as reactive sites on the polymer chain in addition to having unsaturated positions available for crosslinking.

Generally, a stoichiometric ratio of dihydrazide component to organic diisocyanate component is employed although it is sometimes desirable to use a slight excess of the diisocyanate. A slight excess could be used if the diisocyanate were not of high purity since it picks up water and hydrolyzes easily.

A solution polymerization is preferably employed to produce the polymer of the invention. Suitable solvents for polymerization include dimethylsulfoxide, hexamethylphosphoramide, N,N-dimethylformaide and m-cresol. Most preferably, however, dimethylsulfoxide is used.

Reaction conditions of temperature and pressure may vary over a wide range. For example, operable temperatures range between $-72°C$. and $250°C$. and preferably between $20°C$. and $50°C$. Similarly the pressure may range from subatmospheric 0.01 atmosphere to superatmospheric 10 atmospheres but preferably from 1 atmosphere to 3 atmospheres. The reaction is conducted in a closed vessel with a nitrogen blanket to insure a moisture-free atmosphere.

Sometimes the polymer product will not be dissolved by the solvents employed in the polymerizations in any substantial amount. Such a system results in a precipitation of the polymer which can be easily recovered from the reaction of the polymer which can be easily recovered from the reaction mixture by conventional means. It is however, entirely permissible to use a solvent in which the polymer product is soluble since the film or fiber could be produced directly therefrom. Recovery of the polymer from solution is usually accomplished with the aid of an antisolvent. Methanol is usually employed.

The polymers of the present invention have inherent viscosities in the range of 0.50 to 2.0. This corresponds to $n$ is equal to 5–100. The preferable range is $n$ is equal to 50–75. The inherent viscosity is indicative of the degree of polymerization and is used herein as a measure thereof. Inherent viscosity is represented by the equation $$\eta \text{ (inh)} = 1n \text{ } (\eta \text{ relative}/C)$$

where
$\eta$ (relative) $= t/to$
$to =$ flow time through a viscometer of a liquid reference
$t =$ flow time through the same viscometer of a dilute solution of polymer in the reference liquid.
$c =$ concentration of polymer in solution expressed grams/deciliter.

The linear polymers of the present invention can be crosslinked by being dissolved in a crosslinking agent such as styrene, case in desired form, then cured. The linear polymers of the invention can also be crosslinked with themselves without any additional crosslinking agent. Suitable crosslinking agents include styrene, butadiene, methyl methacrylate, vinylacetate, acrylonitrile, vinylidene chloride, isoprene, and the like. Either conventional hot or cold curing procedures can be used.

The curable polymers as described above are dissolved in the crosslinking agent by heating to a temperature in the range of 40° to 100°C. The blending can take place in the presence of a small amount of a polymerization inhibitor such as hydroquinone or 2,6-di-t-butylphenol to prevent premature crosslinking.

In handling the curable polymers of the invention as in the production of films, fiber, cord, molded articles or blends with crosslinking agents the temperature of the polymers should be kept below 220°C. At 220°C. the curable polymer will begin crosslinking with itself by a free radial mechanism. Up to 15 moles of crosslinking agent per mole of unsaturation can be employed, preferably a mole ratio in the range of 1:5 to 5:1 is employed.

After blending, the mixture can be hot cured at a temperature in the range of 50° to 150°C. for 0.5 to 10 hours or cold cured at a temperature of 20° to 50°C for 0.5 to 10 hours.

A free radical catalyst is preferably employed in the curing thus allowing lower curing temperatures. Suitable catalysts include the peroxides such as benzoyl peroxide or azo-bis-isobutyronitrile for hot cures and methyl ethyl ketone peroxide in dimethyl phthalate and 1 percent cobalt naphthenate in a styrene for cold cures. Hot cures can be conducted at a temperature in the range of 50°-150°C. for 0.5 to 10 hours and cold cures at a temperature of 20° to 50°C. for 0.5 to 10 hours.

In addition to catalysts, promoters or accelerators such as N,N-dimethylaniline can be employed during curing. Prior to curing fillers such as glass wool and asbestos, carbon, color pigments and the like can be added.

The following illustration is typical of the reactions in the examples and should serve as a guide to the polymers obtained in each to those within the scope of the invention generally. The reaction in the illustration involves $\alpha, \alpha'$-dimethyl-trans, trans-muconyl dihydrazide and 1,6-diisocyana-tohexane (hexamethylene diisocyanate).

Any methylated dihydrazide may be useful as monomers in the present invention. The preferred dihydrazides are the cis-cis, cis-trans and trans-trans isomers of $\alpha, \alpha'$-dimethylmuconic dihydrazide, $\alpha, \beta$-dimethyl muconic dihydrazide, $\alpha, \beta'$-dimethylmuconic dihydrazide, $\alpha, \alpha', \beta$-trimethylmuconic dihydrazide, $\alpha, \alpha', \beta'$-trimethyl-muconic dihydrazide, $\alpha, \alpha'$-$\beta, \beta'$-tetramethylmuconic dihydrazide and mixtures thereof.

The dihydrazide starting components can be prepared according to the procedure of the commonly assigned application of Anne R. Donnell, Ser. No. 49,176, filed June 23, 1970, by admixing a solution of the methylated muconic acid with a stoichiometric quantity of hydrazine and recovering crystals of the dihydrazide product. This reaction can be effected at a temperature range of 5° to 50°C. with a temperature range of 20° to 35°C. being preferred. The rate of reaction is partially dependent upon the solubility of the reactants in the liquid reaction medium used. The crystalline dihydrazide can be recovered by filtering or any of the other well-known standard procedures used for recovering solids from liquids. The dihydrazides of methylated muconic acids can be prepared from any isomers of the acid or from the mono or diesters of the acids, preparation from the ester being preferred. Some of the diacids and their ester forming derivatives are disclosed in Ser. No. 49,176 and the disclosures of patents mentioned therein are intended to be incorporated here by reference. Exemplary of some of the methylated muconic acids suitable for use in the preparation of the dihydrazides include $\alpha$-methylmuconic acid, $\beta$-methylmuconic acid, $\alpha, \alpha'$-dimethylmuconic acid, $\alpha, \beta$-dimethylmuconic acid, $\alpha, \alpha', \beta$-trimethylmuconic acid, $\alpha, \beta, \beta'$-trimethylmuconic acid, $\alpha, \alpha', \beta, \beta'$-tetramethylmuconic acid and/or monoesters of each of the above-named methylated muconic acids wherein one carboxyl group is attached to a $C_1$ to $C_{20}$ hydrocarbyl radical or their diesters wherein each carboxyl group is attached to a $C_1$ to $C_{20}$ hydrocarbyl radical and mixtures thereof. Each of the above disclosed methylated muconic acids in the cis-cis, cis-trans or trans-trans isomeric form or mixtures thereof is effective for use in the preparation of the dihydrazides.

The hydrocarbyl esters of methylated muconic acids containing $C_1$ to $C_{20}$ carbon atoms are also suitable for use in preparing the dihydrazide compositions useful in the present invention are selected from the hydrocarbyl

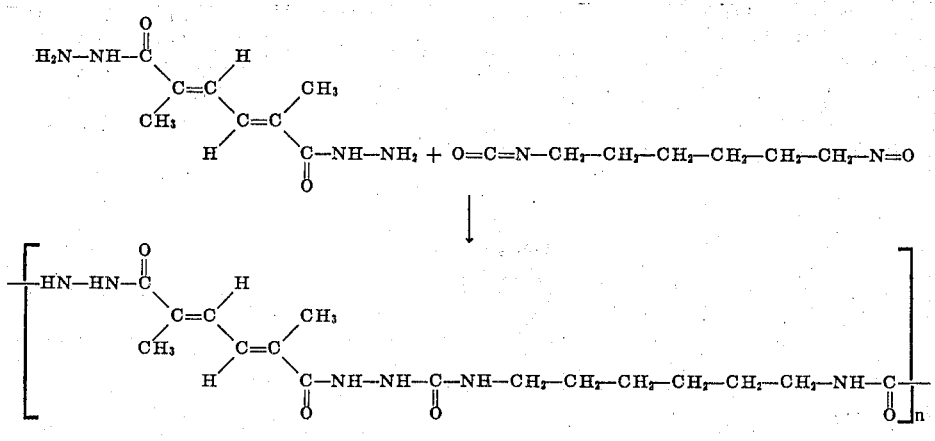

ner product in the final re-
ined from X-ray diffraction
ectroscopy data.

radicals of $C_1$ to $C_{20}$ hydrocarbons having acyclic, cyclic and aromatic structures such as those disclosed in the text *HANDBOOK OF HYDROCARBONNS*, S. W.

Ferris, Academic Press Inc., N.Y. (1955), pages 145 to 249 all of which are incorporated therein by reference. Preferred esters suitable for use in preparing the dihydrazide compositions suitable for use in the present invention include the $C_1$ to $C_{10}$ hydrocarbyl mono and diesters of the methylated muconic acids hereinabove disclosed. Examples of $C_1$ to $C_{20}$ hydrocarbyl groups include methyl, ethyl, butyl, pentyl, hexyl, heptyl, octyl, nonyl, decyl, cyclopentyl, methylcyclopentyl, dicyclopentyl, cyclohexyl, phenyl, tolyl, xylyl, naphthyl, tetrahydronaphthyl, as well as various isomers of each and mixtures of all.

Examples of some of the esters of the polymethylated muconic acids suitable for use in preparation of the dihydrazide compositions of the present invention include mono and dimethyl esters of α-methylmuconic acid, the mono and dimethyl esters of β-methylmuconic acid, the mono and dimethyl esters of α, α'-dimethylmuconic acid, the mono and dimethyl esters of α, β'-dimethylmuconic acid, the mono and diphenyl esters of α, 60'-β,β'-tetramethylmuconic acid, the mono and dinaphthyl esters pf α, β, β'-trimethylmuconic acid, the mone and di-5,6-diethylacenaphthyl esters of α, α'-dimethylmuconic acid, the mono and dicyclohexyl ester of α, α'-dimethylmuconic acid, the mone and di-1,2-dimethylcycloheptyl esters of α, β'-di methylmuconic acid, the mono and didecahydronaphthyl esters of α, α' β, β'-tetramethylmuconic acid, the mono and di-1,3-dipropylbenzyl esters of α, α'-dimethylmuconic acid, the mono and di-2,9-dimethyl-4,7-diisobutyldecyl esters of α, α', β β'-trimethylmuconic acid, the mone and dianthracyl esters of α, β'-dimethylmuconic acid, mono and di-2,6,10-trimethyl decyl esters of α, α'β, β', - tetramethylmuconic acid and the nonyl ethyl esters of α, α' β, β', -tetramethylmuconic acid.

For purposes of general definition, the methylated muconic acid dihydrazide composition useful in the present invention can be defined by the following structural formula:

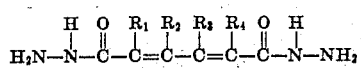

wherein $R_1$, $R_2$, $R_3$ and $R_4$ are selected from hydrogen and $C_1$ to $C_{20}$ hydrocarbyl radicals.

The preferred compositions of the present invention are polymethylated muconic acid dihydrazides. Referring to the structural formula, the dihyrazides of polymethyled muconic acid wherein $R_1$ and $R_4$ are methyl groups $R_2$ and $R_3$ are hydrogen radicals is normally referred to as the dihydrazides of α, α'-dimethyl-cis-cis, cis-trans, trans-trans, preferred muconic acid.

The organic diisocyanates used in the invention are any conventional diisocyanates capable of entering into addition polymerization reactons. The diisocyanates have the formula O=C=N—Z—N=C=O wherein Z is a divalent organic radical selected from the class consisting of alkylene, arylene, cycloalkylene, alkarylene and arlkyene. Exemplary of such diisocyanates are aliphatic diisocyanates of the formula O=C=N—(CH$_2$.)$_n$—N=C=O where n is an integer from 2 to about 10; O-xylylenediisocyanate, 1,4-diisocyanatocyclohexane; 1,3-diisocyanatobenzene; bis(p-iso-cyanatohexyl) methane; 1,6-diisocyanatohexane (hexamethylene diisocyanate); toluene-2,4-diisocyanate; p-phenylene diisocyanate; 4,4'-biphenylene diisocyanate; p,p'-isopropylidene diphenyl diisocyanate, 4,methyl-r-phenyl diisocyanate; methylene bis (4-phenylisocyanate); 4-chloro-1,3-phenylene diisocyanate; 1,5-naphthylene diisocyanate; and 1,5-tetrahydronaphthalene diisocyanate. Arylene diisocyanates, i,e., those in which each of the diisocyanate groups is attached directly to an aromatic ring, are preferred to complement the polycyclic diisocyanates.

The examples presented herein are intended to be merely illustrative and are not intended to limit the scope of the claims. Certain ratios of reactants have been specified. It is to be understood that those of skill in the art will be able to select the respective proportion from each range so as to produce compositions within the spirit and scope of the invention as disclosed. The examples provide guidelines to incidate to those of skill in the art the means and manner of reactant selection, procedures for utilizing the reactants, and the general nature of the polymides to be obtained.

EXAMPLE I

A mixture of 50 ml. dried dimethylsulfoxide and 3.96 grams of α, α'-dimethyl-trans,trans-muconic acid dihydrazide is stirred in a closed reaction vessel under a nitrogen blanket. The dimethylsulfoxide is dried by distillation at reduced pressure. When the dihydrazide has become saturated, 3,48 grams toluene-2,4-diisocyanate is added. As the diisocyanate dissolves, the reaction proceeds exothermically with the evolution of carbon dioxide. After the gas evolution has practically ceased, the reaction is warmed to 60°C. and stirred for 2 additional hours. The resulting solution is viscous, clear and pale yellow. Clear tough films may be cast directly and dried in a vacuum oven at 60°–80°C. The polymer may also be isolated from the original solution by precipitation in water, followed by thorough washing with water in a Waring blender. After filtering and drying in a vacuum oven at 60°–80°C., the inherent viscosity in dimethylsulfoxide is about 0.11 (0.5 percent conc., 25°C). The polymer melt temperature is 191°–192.5°C.

I claim:
1. A crosslinked polymer comprising:
   a. a linear polymer having the following structural formula:

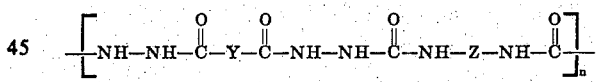

wherein Y is a divalent radical of the group consisting of,

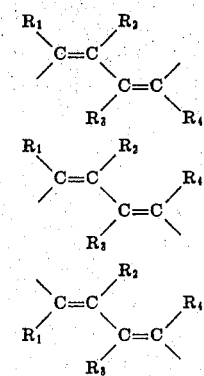

where $R_1$, $R_2$, $R_3$ and $R_4$ are selected from hydrogen and —$CH_3$ with at least one R being —$CH_3$ and mixtures thereof with each other;

n is the number of repeating units

Z is a divalent radical selected from the group consisting of alkylene, arylene, cycloalkylene, alkarylene and aralkylene b. the unsaturation in the linear polymer having been crosslinked with a vinyl monomer, said vinyl monomer having been present in an amount up to 15 moles/mole of unsaturation in the linear polymer.

2. A crosslinked polymer according to claim 1 wherein the vinyl monomer has a mole ratio of monomer to unsaturation of from 1:5 to 5:1.

3. A crosslinked polymer according to claim 1 wherein the monomer is selected from the group consisting of styrene, butadiene, methyl methacrylate, vinyl acetate, acrylonitrile, vinylidene chloride bisoprene.

4. A crosslinked polymer according to claim 3 wherein the monomer has a mole ratio or monomer to unsaturation of from 1:5 to 5:1.

* * * * *